United States Patent
Carlson et al.

(10) Patent No.: US 6,804,496 B1
(45) Date of Patent: *Oct. 12, 2004

(54) COMMUNICATING IN THE PRESENCE OF PERIODIC MICROWAVE NOISE

(75) Inventors: Grant B. Carlson, Pittsford, NY (US); James D. Allen, Rochester, NY (US); Allen D. Heberling, Penfield, NY (US)

(73) Assignee: Appairent Technologies, Inc., West Henriette, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/498,576

(22) Filed: Feb. 4, 2000

Related U.S. Application Data

(60) Provisional application No. 60/118,798, filed on Feb. 5, 1999.

(51) Int. Cl.[7] .............................................. H04B 17/00
(52) U.S. Cl. ................ 455/67.15; 455/63.1; 455/67.13; 455/501; 455/67.11
(58) Field of Search ......................... 455/67.15, 67.13, 455/85, 517, 507, 500, 501, 283, 63.1, 454, 67.11, 68

(56) References Cited

U.S. PATENT DOCUMENTS

| | | | | |
|---|---|---|---|---|
| 5,574,979 A | * | 11/1996 | West | 375/356 |
| 5,581,237 A | * | 12/1996 | DiPoala | 340/554 |
| 5,828,293 A | * | 10/1998 | Rickard | 340/310.01 |
| 6,006,071 A | * | 12/1999 | Roberts et al. | 455/403 |
| 6,374,082 B1 | * | 4/2002 | Carlson | 455/425 |

* cited by examiner

Primary Examiner—Simon Nguyen
(74) Attorney, Agent, or Firm—Staas & Halsey

(57) ABSTRACT

A wireless communication system operating in the presence of the periodic noise signals such as from a microwave oven, the communication system, including at least two wireless communication stations with each station including a transceiver, each such transceiver. Each transceiver includes a detector for detecting periodic noise signals and producing a first signal indicating the presence of noise signal's quiescent period and second signals indicating the end of quiescent periods of such periodic noise signal. A controller responsive to the first and second noise signals controls the transceiver to provide effective communication with an other transceiver which minimizes the noise effect of the periodic noise signal. The transceiver transmits information concerning the detected quiescent period for use by the other transceiver to determine when to transmit during such quiescent period.

3 Claims, 8 Drawing Sheets

COMMUNICATING IN THE PRESENCE OF PERIODIC MICROWAVE NOISE

CROSS REFERENCE TO RELATED APPLICATIONS

Reference is made to commonly-assigned U.S. Provisional Patent Application Ser. No. 60/118,798 filed Feb. 5, 1999, by Carlson et al. entitled "Communicating in the Presence of Periodic Microwave Noise."

FIELD OF THE INVENTION

This invention relates to a digital wireless wideband RF communication system operating in periodic noise environments. Such a system is useful, for example, for communicating digital data at high data rates; e.g. rates greater than 1 Mega bits per second (Mbps).

BACKGROUND OF THE INVENTION

With the advent of digital photography, the wireless transmission of digital images, for example between a portable transmitting device like a digital camera and a receiving device such as a personal computer or other image appliance such as a printer, has become a desirable feature. High data rate transmissions are desirable because digital images represent a large amount of data and short transmission times are needed. Short transmission times result in shorter wait times while an image is being transferred from a camera to a receiver and in reduced battery power consumption.

Although there are several useful communication bands available for such a digital communication system, the 2.4 to 2.5 GHz ISM Band is particularly attractive because the band is unlicensed and available internationally. However, a major problem exists with the use of this band for wireless communication. The band is allocated for microwave ovens and other devices, which as described below, generate a great deal of periodic noise in the band. Other communication bands like the 5.75 GHz band can also have periodic noise generators present. For the purpose of describing the present invention, references will only be made to periodic microwave noise as is present in the 2.4 to 2.5 GHz ISM band. It will be understood that the same principles can be used in the presence of any other kind of periodic noise in any communication band.

Radio frequency (RF) transmissions in the 2.4 to 2.5 GHz ISM Band have historically had to deal with the presence of man-made noise from microwave ovens that predominately operate in the center of this band at 2.45 GHz. The noise emanates from the oven by leakage through the enclosure of the oven. The leakage noise is periodic and has a radiated output power approximately 20 dB greater in strength than that allowed by the FCC for operation of Part 15 non spread spectrum radios. With over 200 million microwave ovens in use throughout the world, they are by far the greatest and most significant source of noise in this band. In addition microwave lighting and illumination systems are soon to be in use in the same band creating additional noise interference. Some examples of locations where it would be desirable to transmit images in the presence of periodic microwave noise are in the home (particularly in the kitchen), or in a supermarket or department store where a photo kiosk may be located near a microwave oven or lighting system.

One possible way to communicate in the presence of microwave noise is to use a spread spectrum communication technique. One type of spread spectrum technique spreads the signal over a band which is much larger than the bandwidth of the signal so that the narrow band noise from the noise source has a reduced effect on the demodulated signal to noise ratio. This technique however is relatively expensive to implement, significantly limits the data throughput (e.g. by a factor of 8 or more) and does not work well if the receiver is located very close to the noise source. Another way to communicate in the presence in the presence of microwave noise is described in U.S. Pat. No. 5,574,979, issued Nov. 12, 1996 to West, entitled "Periodic Interference Avoidance in a Wireless Radio Frequency Communication System." This patent demonstrates a potential solution by avoiding microwave oven periodic noise by sensing the periodicity of the AC power line main in which the oven is connected to. Unfortunately this technique does not work for periodic noise sources other than microwave ovens or in cases where multiple microwave noise sources on different phases exist. This technique also does not work in cases where the RF communication equipment is battery powered and no connection to an AC power main can be made, nor can the AC main E field radiation be received by the RF communication equipment. Furthermore this approach does not address the problem where one of the wireless communication stations can sense the noise, but the other wireless communication station cannot; when both stations are subjected to noise having different characteristics; or when three or more stations are trying to communicate and one or more are in a noise environment.

There is a need therefore for an improved means of digital communication in environments with periodic noise.

SUMMARY OF THE INVENTION

This need is met by a wireless communication system operating in the presence of periodic noise signals such as from a microwave oven, that includes at least two wireless communication stations with each station including a transceiver, each such transceiver. Each transceiver includes a detector for detecting periodic noise signals and producing a first signal indicating the presence of noise signal's quiescent period and second signals indicating the end of quiescent periods of such periodic noise signal. A controller responsive to the first and second noise signals controls the transceiver to provide effective communication with an other transceiver which minimizes the noise effect of the periodic noise signal. The transceiver transmits information concerning the detected quiescent period for use by the other transceiver to determine when to transmit during such quiescent period.

Advantages of the present invention include:

1. When each station can tell the other station(s) when periodic microwave signals will prevent reception, the transmitting stations can wait to transmit during the proper time. While waiting, systems may be powered down to reduce energy consumption, reduce interference with other devices and more efficiently control data flow to and from the host CPU; and
2. If two stations have interference between them, either partially or completely overlapping in time, the stations can look for other available stations with which to communicate in a more efficient manner, or wait until the first station is more available.

This invention is less expensive than one that uses a master clock to assign a global time reference to all stations and their quiescent periods. Such a system requires expensive accurate internal time bases or access to a Global Positioning System time base such as used by Code Division Multiple Access cellular systems.

DETAILED DESCRIPTION OF THE INVENTION

Figure 1:
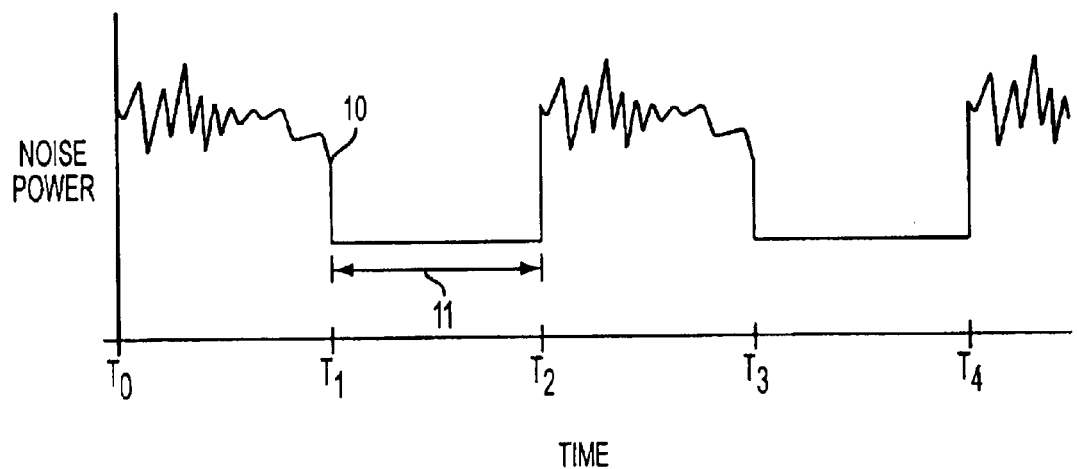
FIG. 1 is a plot of a typical RF waveform produced by a microwave oven.

In addressing the above problem, it is understood that the energy emitted by a microwave oven is periodic at a frequency based on the AC power line voltage frequency. Referring to FIG. 1, a typical noise energy waveform 10 produced by a microwave oven is shown. The source of the RF noise energy is the magnetron within the microwave oven, which is driven by the AC power line. The output noise spectrum is pulsed at approximately a 50% duty cycle synchronized to the AC line voltage. The frequency of the periodic microwave signal us usually 50 or 60 Hertz or 100 or 120 Hz for bridge rectified systems. According to the present invention, this pulsed noise is detected and communication is conducted during the quiescent periods, that is during the periods 11 (between times $T_1$ and $T_2$ and times $T_3$ and $T_4$) when the microwave oven is off.

Figure 2:
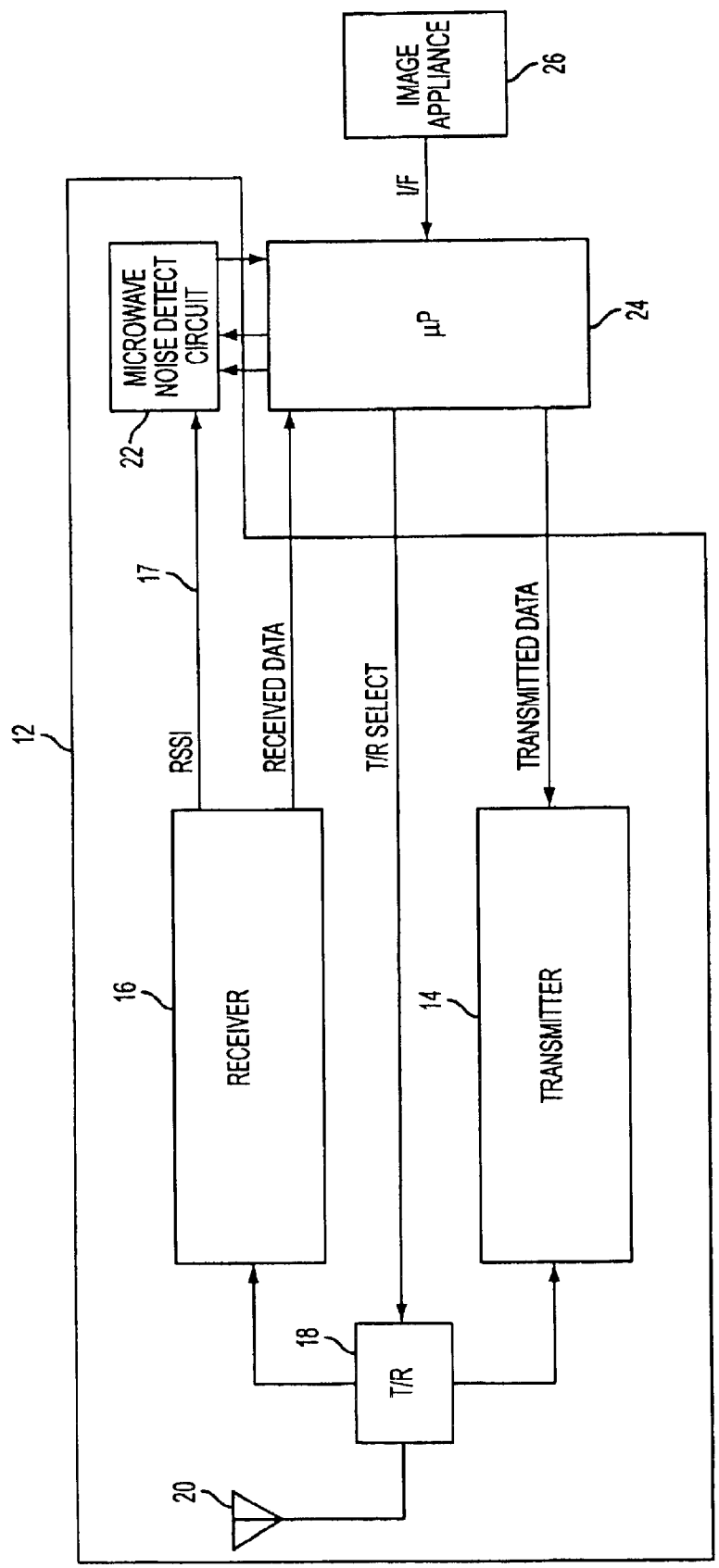
FIG. 2 is a block diagram of a transceiver according to the present invention.

Referring to FIG. 2, a system for communicating digital data according to the present invention includes a transceiver 12 for communicating in the presence of microwave oven. The term "transceiver" means a transmitter-receiver combination. The transceiver includes a transmitter 14, a receiver 16, and a transmit/receive switch 18 that selectively connects an antenna 20 to the transmitter or the receiver. The transmitter 14 is a standard design 2.4 to 2.5 GHz transmitter employing any known modulation scheme such as frequency shift keying FSK or quadrature phase shift keying QPSK. The receiver 16 is a standard design 2.4 to 2.5 GHz receiver with the capability of demodulating a 20 Mbps FSK or a 40 Mbps QPSK signal. The FSK demodulator in the receiver 16 is for example a Motorola MC13155 integrated circuit. The transceiver 12 also includes a microwave noise detect circuit 22 connected to the RSSI 17 (Receive Signal Strength Indicator) of the receiver 16.

The transceiver 12 is controlled by a microprocessor 24. The microprocessor 24 may for example be a microprocessor that is also used to control an image appliance 26 (i.e. camera, printer, kiosk, or personal computer), or may be a microprocessor that is specifically supplied with the communication system. The microprocessor 24 controls the transmit/receive switch 18, prepares the data from the image appliance 26 to be transmitted by transmitter 14, and receives the data from the receiver 16 to supply received data to the image appliance 26.

Figure 3:
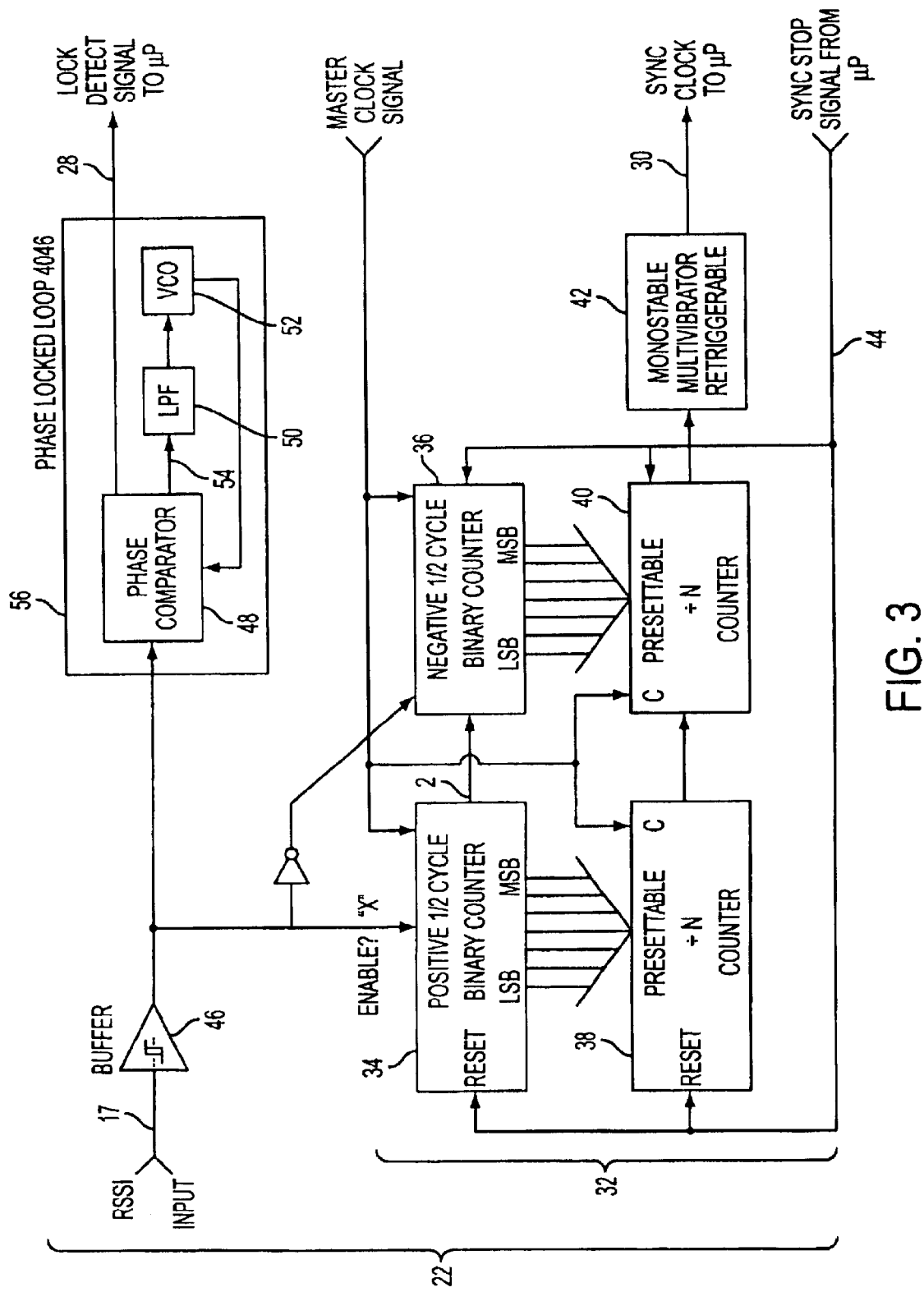
FIG. 3 is a block diagram of a microwave oven detection circuit.

Referring to FIG. 3, microwave noise detect circuit 22 uses the RSSI signal 17 from the receiver 16 to generate a sync clock 30 and a Lock detect 28 signal as described below, which are supplied to the microprocessor 24 for controlling the communication of data during quiescent periods in the microwave oven noise 10. The main function of this circuitry 22 is to lock on to the envelope of the microwave oven noise 10 using the AM detector in the RSSI circuitry (not shown) to generate a Lock detect signal 28 and a synchronization (Sync) clock 30 for the microprocessor.

The Lock detect signal 28 informs the microprocessor 24 that an AC line frequency periodic microwave energy signature is present. To generate the Lock detect signal 28, the RSSI 17 input signal coming from the receiver is first buffered 46 and provided both to a phase locked loop circuit 56 and sync clock generator circuitry 32. The phase locked loop circuit 56 includes a Voltage Controlled Oscillator (VCO) 52, a Phase Comparator 48 that produces a phase error output signal 54 and a Low Pass loop Filter (LPF) 50. The circuit is designed to provide a Lock detect signal 28 if it is supplied with a 50 to 120 Hertz RSSI signal 17. The circuit is commercially available in integrated circuit form from manufacturers such as Motorola. A commonly used part number is CD4046.

Figure 4:
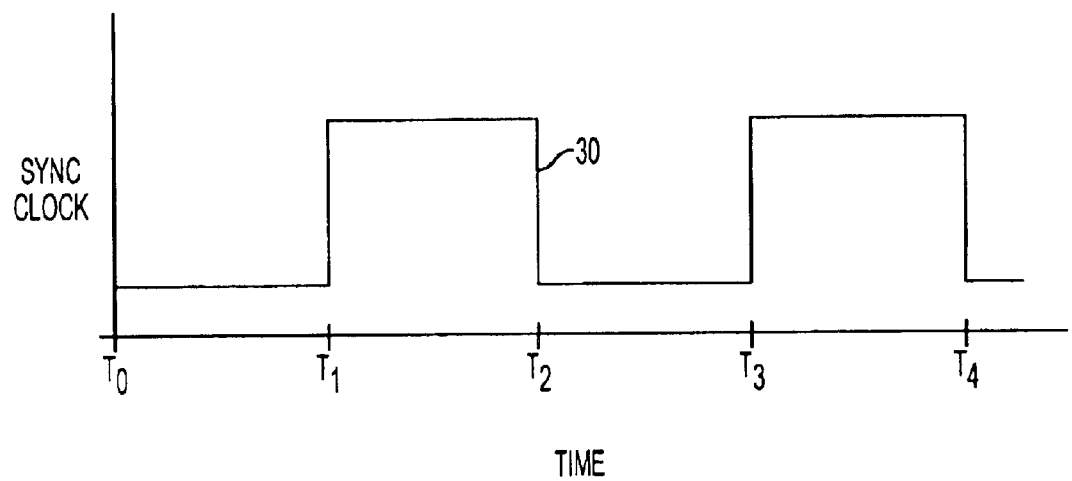
FIG. 4 is a plot of the sync clock signal generated by the microwave oven noise detection circuit of FIG. 3.

FIG. 4 shows the Sync clock signal 30 referenced to the microwave oven noise energy in FIG. 1. Sync clock signal 30 is generated separately from Lock detect signal 28 using sync clock generator circuitry 32. Sync clock signal 30 is identical to the RSSI 17 signal in its pulse width, frequency and duty cycle. It is used to predict when the microwave oven will be in the quiescent state. This detect and latch process is necessary since the RSSI 17 signal will not be able to separate the microwave oven noise from the transceiver activity, once data communications commences. Binary counters 34, 36 sample the RSSI 17 high and low periods and load the result into pre-setable counters 38, 40. Once the data is loaded, the Sync clock 30 is generated by monostable multivibrator 42 without the microwave signature provided by the RSSI signal 17. The Sync clock 30 is provided to the microprocessor 24 and is used to enable the transmitting of the image data only during the predicted quiescent or "off" periods 11 in the microwave oven's noise signature. The Sync clock 30 continues to run until the microprocessor determines it is no longer needed, or that the quiescent period has shifted in phase. The microprocessor then resets the microwave noise detect circuitry 22 to obtain a new Sync clock signal 30.

Phase shifting can be caused by noise from multiple microwave ovens on different power phases (i.e. the duty cycle of the quiescent time available for communication is reduced). If three ovens are on simultaneously using three different AC phases, the RSSI signal will be high the entire AC cycle and there will be no Lock detect signal 28. The microprocessor 24 will cause the transceiver to search for a quiet channel. Once a lock is established however, the microprocessor 24 knows when to stop using the Sync clock either when the receiver at the far end signals the transmitter that the microwave oven noise has stopped and it has verified the noise has stopped by listening, or its Lock detect 28 goes high again synchronous with the Sync clock signal 30, indicating that the oven noise is gone, and the transmitter is causing its own lock detect signal.

This approach works for different AC line frequencies, and works even if there are multiple ovens, or ovens on at least two phases of an AC distribution system, and other periodic microwave energy sources.

Figure 5:
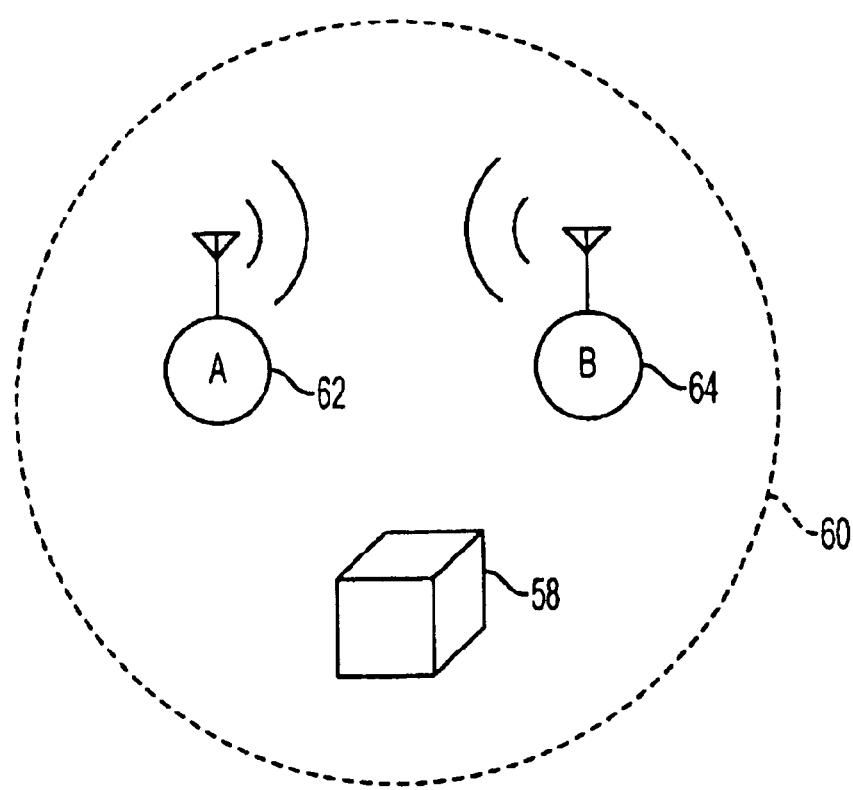
FIG. 5 is a schematic diagram depicting the situation wherein both stations are receive interference from the same noise source.

The above described system works most simply when the receiving and transmitting stations 62, 64 are both in the same range of the microwave oven noise source 58 as in FIG. 5, and both stations can determine the quiescent period for themselves. This range 60 is defined by the locus of points where the transmitter signal to oven noise ratio is greater than for example about 12 dB, corresponding to a good signal reception condition.

Figure 6:
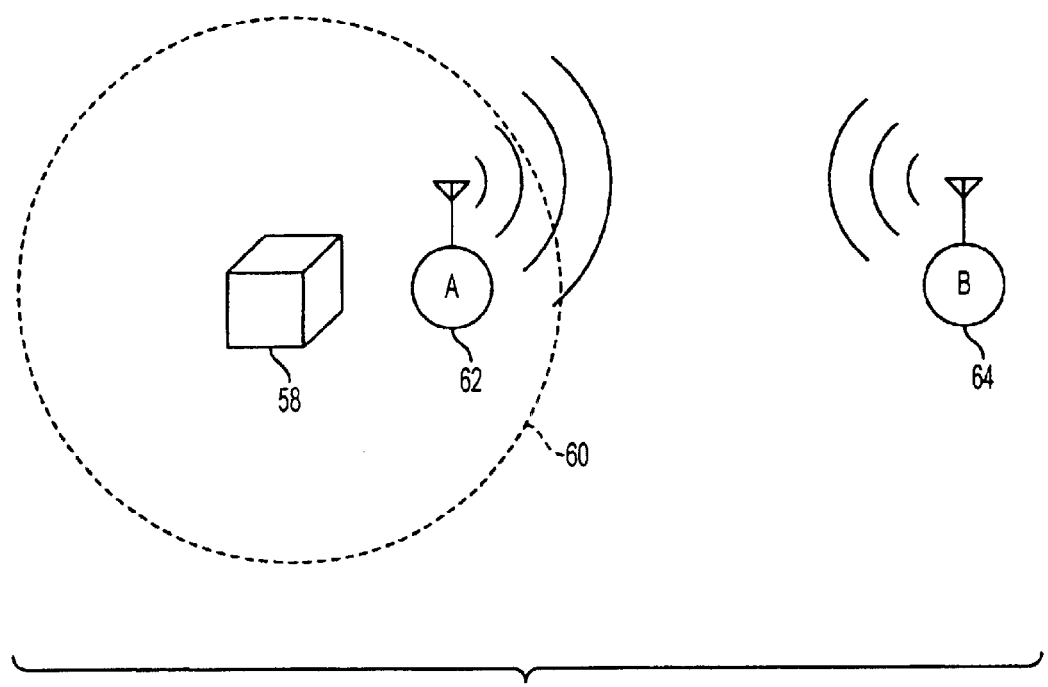
FIG. 6 is schematic diagram depicting the situation in which only one of two stations is receiving interference.

In FIG. 6, the transceiver station "A's" 62 ability to receive is affected by the noise from the oven 58 but station "B" is not. Note that even if station A's ability to transmit is not affected by the oven if we assume that station B can receive station A under normal conditions. It this arrangement, station B needs to be told when station A can receive it's signals.

Figure 7:
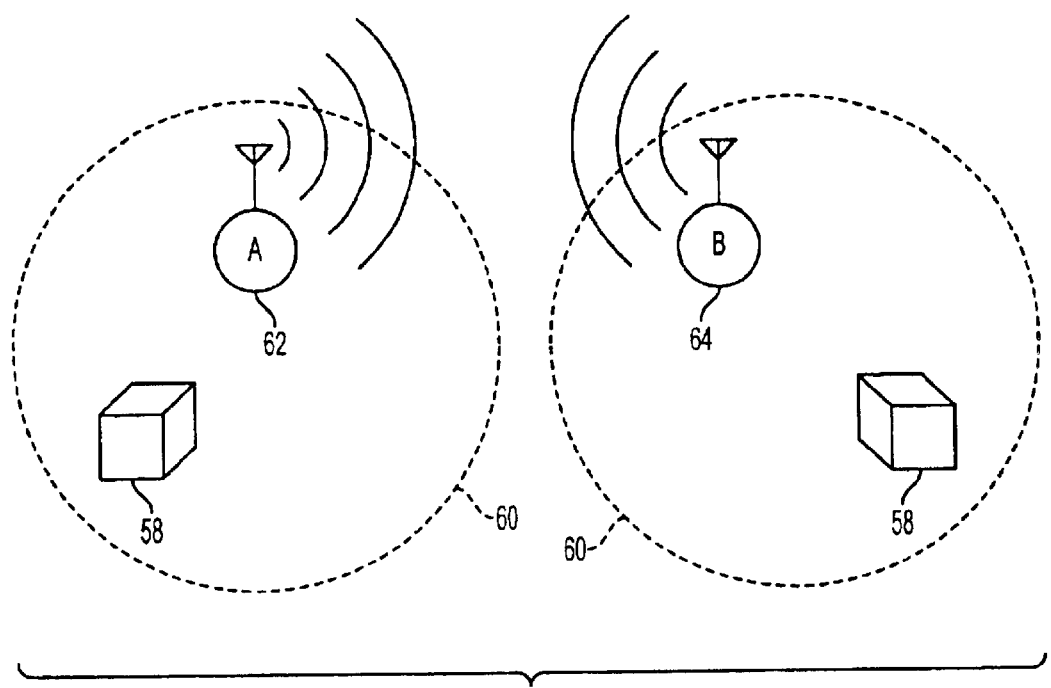
FIG. 7 is a schematic diagram depicting the situation in which both stations are being receiving interference from different noise sources.

In FIG. 7, Both stations A and B are in the presence of oven noise. In this scenario, both stations have to inform the other of their quiescent periods. If the ovens are on the same AC power phase, this case reverts to FIG. 5. If the ovens are on different phases, and start at different times for different duration, the quiescent data must be transmitted to each station, and may occur at any point in the received packet sequence. The host or Media Access Controller must keep track of the status and phase of each station.

Figure 8:
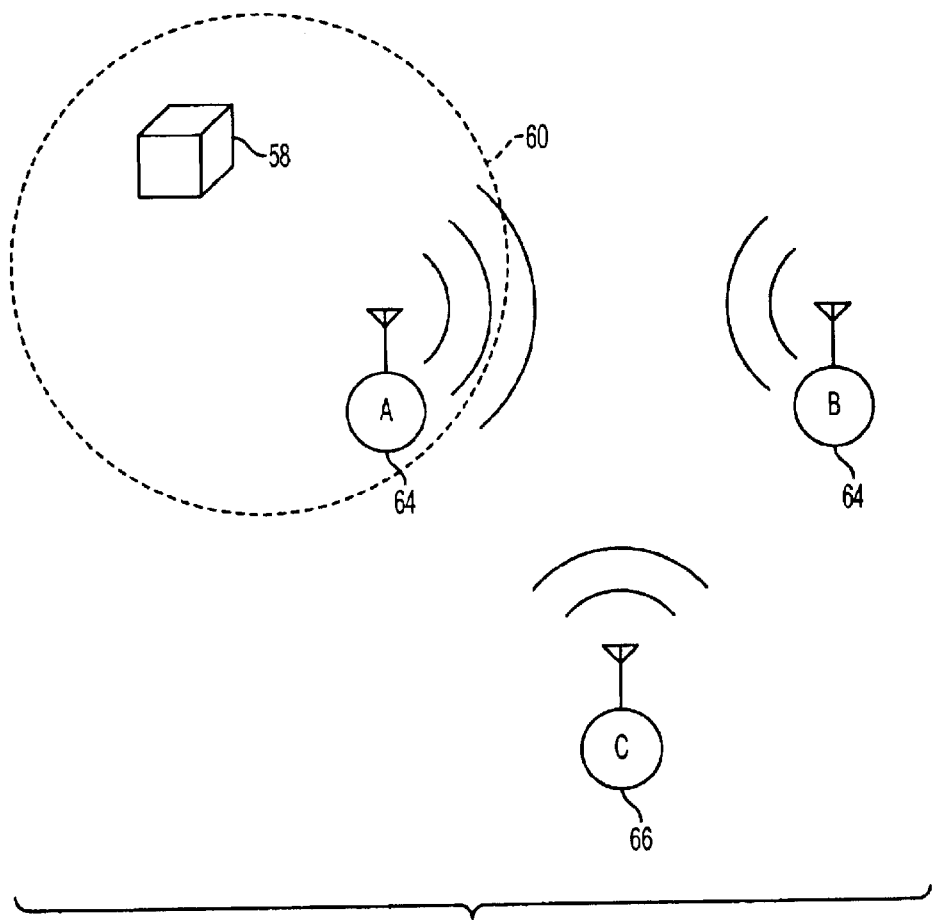
FIG. 8 is a schematic diagram depicting multiple stations with one noise source.

FIG. 8 shows the case where only one of three stations is affected by oven noise. In this case, stations B, 64 and C, 66 may decide to communicate and wait until A, 64 is no longer in a noisy environment, or until stations B and C have completed their communications.

To communicate information during quiescent periods, the data is communicated in a series of packets that are shorter than the quiescent period. The first packet of the series is called a start packet and it includes information about the presence and frequency of any detected noise and the identity of the station sending the packet.

Figure 9:
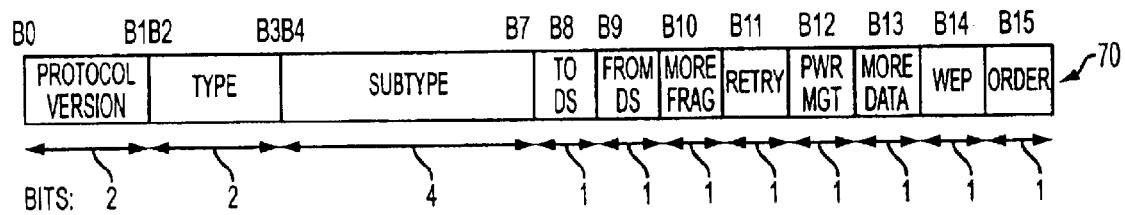
FIG. 9 shows an example packet format that can be used to communicate quiescent period, duration, signal strength and type of service data to other stations.

Since the quiescent period is much larger than any one packet, one approach is to have short packets dedicated to representing the start and stop of the quiescent period for any station to broadcast. Another approach is to have the start packet contain the duration of the quiescent period whereby the stop packet is not needed. FIG. 9 shows a packet structure for accomplishing this function. FIG. 9 demonstrates "management" type packets, and Beacon "subtypes" 70 as defined by section 7.1.3 of the IEEE 802.11 wireless Ethernet. Packets subtypes can include: SOQP (Start of Quiescent Period) 68, EOQP (End of Quiescent Period) 72, and OS (Oven Stop).

Figure 10:
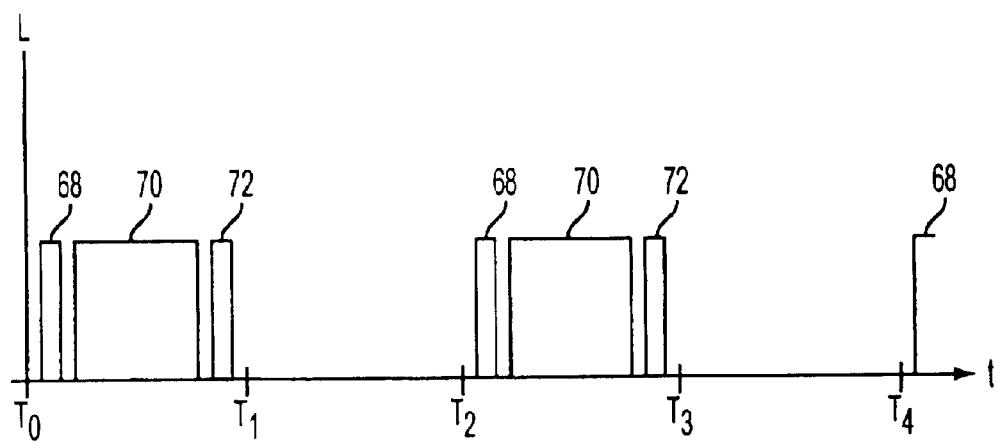
FIG. 10 is a timing diagram based on FIG. 4 showing when the "start of quiescent period" and "end of quiescent period" packets would be transmitted.

FIG. 10 shows how the use of start and stop packets that would be transmitted with respect to the oven sync clock signal defined in FIG. 5. If the transmitted start packet contains the duration of the quiescent period than a timer in the receiver would be used to keep tract of EOQP and a stop packet would not be sent. Once communicated the status of the receivers and transmitters are known. Decisions can be made when to communicate with each station based on it's availability. If the SOQP packets also contain the RSSI signal strength of the interfering periodic energy, additional decisions can be made based on the degree of interference.

In addition, since stations can transmit through interfering periodic microwave signals to receivers not affected by interfering periodic microwave signals, stations transmitting isochronous data or video streams such as USB devices or video devices can indicate the type of data (asynchronous or isochronous) in the SOQP or beacon packet and cause the receiver to enter a special mode. In this mode, the transmitter can continue to transmit and the receiver can receive without bidirectional flow control or packet control such as packet acknowledgment.

Furthermore, any system or subsystem of the communication or host device, not able to be used can be shut down or reduced in power when ever this quiescent period data indicates it's function will be unnecessary for a determined amount of time. This reduces power consumption and improves battery life for portable devices.

The invention has been described in detail with particular reference to certain preferred embodiments thereof, but it will be understood that variations and modifications can be effected within the spirit and scope of the invention.

Parts List 10 microwave oven noise energy wave form
11 quiescent (off) period
12 transceiver
14 transmitter
16 receiver
17 Receive Signal Strength Indicator (RSSI)
18 transmit/receive switch
20 antenna
22 microwave noise detect circuit
24 microprocessor
26 imaging appliance
28 Lock detect signal
30 Sync clock signal
32 Sync clock circuitry
34 binary counter
36 binary counter
38 pre-setable counter
40 pre-setable counter
42 monostable multivibrator
44 Sync Stop signal
46 buffer
48 phase comparator
50 low pass loop filter
52 Voltage Controlled Oscillator
54 phase error signal
56 phase locked loop
58 Microwave Oven
60 Range of oven noise
62 Transceiver station A
64 Transceiver station B
66 Transceiver station C
68 "Start of quiescent period" packet
70 Regular packet period
72 "End of quiescent period" packet

What is claimed is:

1. A wireless communication system operating in the presence of periodic noise signals, the communication system, comprising:

the wireless communication system including at least two wireless communication stations with each station including a transceiver, each said transceiver including:
a detector detecting periodic noise signals and producing a first signal indicating the presence of noise signal's quiescent period and second signals indicating the end of quiescent periods of said periodic noise signal;
a controller responsive to the first and second noise signals for controlling the transceiver to provide effective communication with an other transceiver which minimizes the noise effect of the periodic noise signal; and means for transmitting information concerning the detected quiescent period for use by the other transceiver to determine when to transmit during said quiescent period.

2. The wireless communications system as set forth in claim 1, wherein each transceiver operates in the presence of noise having different periodicity and wherein each transceiver further comprises means for transmitting during the quiescent period of the noise detected by the other transceiver.

3. A wireless communication system operating in the 2.4 to 2.5 GHz band in the presence of the periodic noise signals the communication system, comprising:

the wireless communication system including at least three wireless communication stations where one of said stations is a network controller and the others are device stations, each station comprising a transceiver and each said transceiver including;

a detector detecting periodic microwave signals and producing a first signal indicating the presence of noise signal's quiescent period end second signals indicating the end of quiescent periods of said periodic noise signal; and a transceiver controller responsive to the first and second signals for controlling its transceiver to provide effective microwave communication with the other transceiver which minimizes the noise effect of the periodic microwave signal; and the network controller transceiver including means for receiving information concerning received noise quiescent period from the device stations and for signaling said device stations indicating when the device stations can transmit information to control traffic between the device stations and the network controller.

* * * * *

UNITED STATES PATENT AND TRADEMARK OFFICE
CERTIFICATE OF CORRECTION

PATENT NO. : 6,804,496 B1
DATED : October 12, 2004
INVENTOR(S) : Grant B. Carlson et al.

It is certified that error appears in the above-identified patent and that said Letters Patent is hereby corrected as shown below:

<u>Column 8,</u>
Line 5, change "end" to -- and --.

Signed and Sealed this

Third Day of May, 2005

JON W. DUDAS
*Director of the United States Patent and Trademark Office*